(12) United States Patent
Ono et al.

(10) Patent No.: US 11,895,283 B2
(45) Date of Patent: Feb. 6, 2024

(54) IMAGE ANALYZER DETERMINES IN-USE INK INFORMATION USING IMAGE DATA ACCORDING TO PRESET CONDITIONS AND ACQUIRES PRESPECIFIED IMAGE QUALITY INFORMATION WHEN IMAGE IS PRINTED

(71) Applicant: SEIKO EPSON CORPORATION, Tokyo (JP)

(72) Inventors: Takuya Ono, Nagano (JP); Yuko Yamamoto, Nagano (JP); Takahiro Kamada, Nagano (JP); Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/309,850

(22) Filed: May 1, 2023

(65) Prior Publication Data
US 2023/0353698 A1 Nov. 2, 2023

(30) Foreign Application Priority Data
May 2, 2022 (JP) .................................. 2022-076066

(51) Int. Cl.
*H04N 1/60* (2006.01)
*H04N 1/00* (2006.01)

(52) U.S. Cl.
CPC .......... *H04N 1/603* (2013.01); *H04N 1/0044* (2013.01); *H04N 1/6027* (2013.01); *H04N 1/6063* (2013.01); *H04N 1/6097* (2013.01)

(58) Field of Classification Search
CPC .. H04N 1/23; H04N 1/00074; H04N 1/00076; H04N 1/00079; H04N 1/58; H04N 1/60; H04N 1/603; H04N 1/6027; H04N 1/605; H04N 1/6063; H04N 1/6097
See application file for complete search history.

(56) References Cited

U.S. PATENT DOCUMENTS

| | | | |
|---|---|---|---|
| 8,610,952 B2 * | 12/2013 | Fukuda | H04N 1/6033 358/1.9 |
| 9,965,708 B2 * | 5/2018 | Okumura | H04N 1/6052 |
| 11,477,348 B2 * | 10/2022 | Hagihara | H04N 1/605 |
| 2005/0094169 A1 * | 5/2005 | Berns | H04N 1/6033 358/1.9 |

(Continued)

FOREIGN PATENT DOCUMENTS

| JP | 2004199171 A | * | 7/2004 |
|---|---|---|---|
| JP | 2012-205166 A | | 10/2012 |

(Continued)

*Primary Examiner* — Scott A Rogers
(74) *Attorney, Agent, or Firm* — Global IP Counselors, LLP

(57) ABSTRACT

An image analyzer includes an in-use ink information determination section that determines an ink type to be used for printing and an ink quantity to be used for printing for the ink type as in-use ink information by using image data in accordance with conditions set in advance, a printed image quality information acquisition section that acquires at least one item of printed image quality information on image quality specified in advance and provided when the image data is printed by using the determined in-use ink information, and a display section that displays at least one of the in-use ink information and the printed image quality information.

7 Claims, 14 Drawing Sheets

(56) References Cited

U.S. PATENT DOCUMENTS

| | | | | |
|---|---|---|---|---|
| 2005/0094871 A1* | 5/2005 | Berns | ................... | H04N 1/6033 |
| | | | | 358/1.9 |
| 2005/0259295 A1* | 11/2005 | Nagao | ...................... | H04N 1/60 |
| | | | | 715/204 |
| 2023/0144881 A1* | 5/2023 | Tanaka | ................... | B41J 2/2103 |
| | | | | 347/7 |

FOREIGN PATENT DOCUMENTS

| | | |
|---|---|---|
| JP | 2013-046286 A | 3/2013 |
| JP | 2016-058765 A | 4/2016 |

\* cited by examiner

FIG. 4

| INK TYPE | DUTY LIMIT |
|---|---|
| ☑ CYAN (C) | 100 |
| ☑ MAGENTA (M) | 100 |
| ☑ YELLOW (Y) | 100 |
| ☑ BLACK (B) | 50 |
| ☑ RED (Rd) | 100 |
| ☑ GREEN (Gr) | 100 |
| ☑ BLUE (Bl) | 100 |
| ☑ VIOLET (Vi) | 100 |
| ☑ ORANGE (Or) | 100 |
| ☐ FLUORESCENT YELLOW (FY) | 0 |
| ☐ FLUORESCENT MAGENTA (FM) | 0 |

TB1

| PRINT MEDIUM | PHOTOGRAPHIC PAPER |
|---|---|

FIG. 9

| | INK TYPE | DUTY LIMIT |
|---|---|---|
| ☑ | CYAN (C) | 100 |
| ☑ | MAGENTA (M) | 100 |
| ☑ | YELLOW (Y) | 100 |
| ☑ | BLACK (B) | 50 |
| ☑ | RED (Rd) | 100 |
| ☑ | GREEN (Gr) | 100 |
| ☐ | BLUE (Bl) | 0 |
| ☐ | VIOLET (Vi) | 0 |
| ☐ | ORANGE (Or) | 0 |
| ☐ | FLUORESCENT YELLOW (FY) | 0 |
| ☐ | FLUORESCENT MAGENTA (FM) | 0 |

TB1

| PRINT MEDIUM | PHOTOGRAPHIC PAPER |
|---|---|

| | INK TYPE | DUTY LIMIT |
|---|---|---|
| ☑ | CYAN (C) | 100 |
| ☑ | MAGENTA (M) | 100 |
| ☑ | YELLOW (Y) | 100 |
| ☑ | BLACK (B) | 50 |
| ☑ | RED (Rd) | 100 |
| ☑ | GREEN (Gr) | 100 |
| ☐ | BLUE (Bl) | 0 |
| ☐ | VIOLET (Vi) | 0 |
| ☐ | ORANGE (Or) | 0 |
| ☑ | FLUORESCENT YELLOW (FY) | 100 |
| ☐ | FLUORESCENT MAGENTA (FM) | 0 |

| PRINT MEDIUM | PHOTOGRAPHIC PAPER |
|---|---|

| | PRINTED IMAGE QUALITY INFORMATION | PRIORITY |
|---|---|---|
| ☑ | GRANULARITY | HIGH |
| ☑ | TONALITY | LOW |
| ☐ | COLOR REPRODUCIBILITY | NOT APPLICABLE |

TB3

PT7

IMAGE ANALYZER DETERMINES IN-USE INK INFORMATION USING IMAGE DATA ACCORDING TO PRESET CONDITIONS AND ACQUIRES PRESPECIFIED IMAGE QUALITY INFORMATION WHEN IMAGE IS PRINTED

The present application is based on, and claims priority from JP Application Serial Number 2022-076066, filed May 2, 2022, the disclosure of which is hereby incorporated by reference herein in its entirety.

BACKGROUND

1. Technical Field

The present disclosure relates to an image analyzer.

2. Related Art

There is a known image analyzer showing granularity information in an image in a color space, the granularity information representing a color material's granularity according to the coordinate values of the color space (JP-A-2016-58765, for example). The image analyzer displays the granularity information with the granularity information changed in correspondence with a change in the consumption of the color material to allow a user to adjust the consumption of the color material while checking the granularity before printing.

The technology of the related art does not allow the user to check before printing a change in image quality that occurs when the type of color material being used is changed.

SUMMARY

The present disclosure can be achieved as the following aspect.

According to a first aspect of the present disclosure, an image analyzer is provided. The image analyzer includes an in-use ink information determination section that determines an ink type to be used for printing and an ink quantity to be used for printing for the ink type as in-use ink information by using image data in accordance with conditions set in advance, a printed image quality information acquisition section that acquires at least one item of printed image quality information on image quality specified in advance and provided when the image data is printed by using the determined in-use ink information, and a display section that displays at least one of the in-use ink information and the printed image quality information.

BRIEF DESCRIPTION OF THE DRAWINGS

FIG. 4 is a descriptive diagram showing a condition setting screen.

FIG. 9 is a descriptive diagram showing a table after a first change in the conditions made by a user.

DESCRIPTION OF EXEMPLARY EMBODIMENTS

A. First Embodiment

Figure 1:
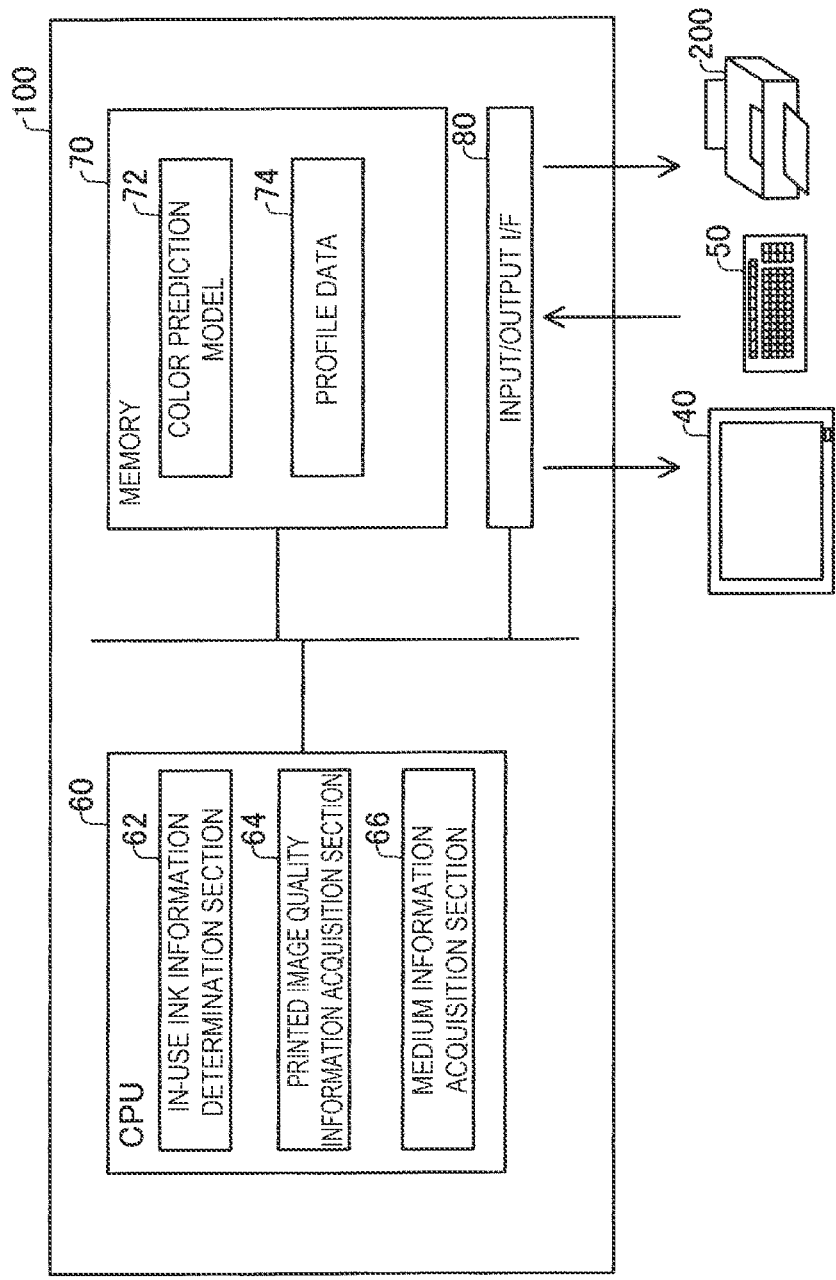
FIG. 1 is a block diagram showing the configuration of an image analyzer as a first embodiment of the present disclosure.

FIG. 1 is a block diagram showing the configuration of an image analyzer 100 according to a first embodiment of the present disclosure. The image analyzer 100 acquires and displays in-use ink information representing the types of ink used for printing and an ink quantity for each of the types of ink, and printed image quality information regarding the image quality provided when image data is printed by using the in-use ink information. An imaginary printed image produced when image data is printed by using the in-use ink information is also called an "expected printed image". A user can use the image analyzer 100, for example, to check the in-use ink information and the printed image quality information before printing image data. The user can refer to the result of the evaluation performed by the image analyzer 100, perform printing when the result has a desired content, or change printing conditions when the result does not have the desired content, and then check the in-use ink information and the printed image quality information. In the present embodiment, the image analyzer 100 acquires color reproducibility as the printed image quality information. The term "color reproducibility" means the result of determination of whether a color value contained in the image data is in a gamut section of a printing apparatus so that the color can be reproduced, or whether the color value is not in the gamut section so that the color cannot be reproduced. The "image data" means dot-matrix data that specifies the color of each pixel with the RGB color components each expressed in tone. In the present embodiment, the pixel value of each pixel in the image data has 256 tone levels on a color basis, and is data expressed in a color system according to the sRGB standard. It is, however, noted that the image data is not limited to RGB data and can, for example, be JPEG image data expressed in the YCbCr color system, data expressed in the CMYK color system, and a variety of other types of data.

The image analyzer 100 is a computer including a CPU 60, a storage device 70, and an input/output I/F 80. The CPU 60, the storage device 70, and the input/output I/F 80 are coupled to each other via an internal bus in a bidirectionally communicable manner. An input device 50 for operation, such as a keyboard and a mouse, a display 40 for screen display, and a printer 200 are coupled to the image analyzer 100 via the input/output I/F 80.

The CPU 60 functions as an in-use ink information determination section 62, a printed image quality information acquisition section 64, and a medium information acquisition section 66 by executing a control program stored in advance in the storage device 70. The in-use ink information determination section 62 uses the pixel values contained in the image data to calculate the types of ink to be used for printing and the ink quantity on an ink type basis as the in-use ink information in accordance with conditions set in advance. The printed image quality information acquisition section 64 acquires the printed image quality information provided when the image data is printed by using the acquired in-use ink information. In the present embodiment, the printed image quality information acquisition section 64 acquires the color reproducibility of the colors of the expected printed image. The medium information acquisition section 66 acquires information on a print medium entered by the user.

The storage device 70 includes a ROM, a RAM, and an EEPROM. The storage device 70 stores a variety of programs that realize the functions provided in the present embodiment, a color prediction model 72, and profile data 74. The profile data 74 is a profile used to convert RGB data into image color values. In the present embodiment, the profile data 74 is used to convert the sRGB color space into the L*a*b* color space. The color prediction model 72 is used to acquire predicted spectral reflectance of printed matter in a case where printing is performed by using the combination of the ink quantities used by the printer 200. In the conversion of RGB data from image color values into ink quantity data, the RGB data can be so converted by using the color prediction model 72 that the spectral reflectance of an image indicated by the inputted image color values is reproduced. The color prediction model 72 can be created, for example, by actually printing a color chart for a plurality of representative points in an ink quantity space indicated by an ink color system, acquiring the spectral reflectance of the printed color chart, and using the correspondence between the ink quantity set and the spectral reflectance as learning data to perform neural network learning.

The printer 200 includes a mechanism that allows ink cartridges filled with a plurality of color inks to be attached to and removed from the printer 200 on a color basis. The cartridges incorporated in the printer 200 contain cyan (C) ink, magenta (M) ink, yellow (Y) ink, and black (K) ink, which are typical color inks, and red (Rd) ink, green (Gr) ink, blue (Bl) ink, violet (Vi) ink, orange (Or) ink, fluorescent yellow (FY) ink, and fluorescent magenta (FM) ink, which are special color inks. Cartridges containing light cyan (Lc) ink, light magenta (Lm) ink, and other color inks may further be incorporated in the printer 200. The printer 200 can discharge the inks from nozzles formed at carriages while causing a carriage to scan a print medium in the primary-scan direction and a paper feed roller to move the print medium in the secondary-scan direction, combines the ink colors with one another to form a large number of colors, and forms a color image on the print medium. In the present embodiment, the printer 200 is an inkjet printer, and a variety of other types of printers, such as a laser printer, can instead be used in place of an inkjet printer.

Figure 2:
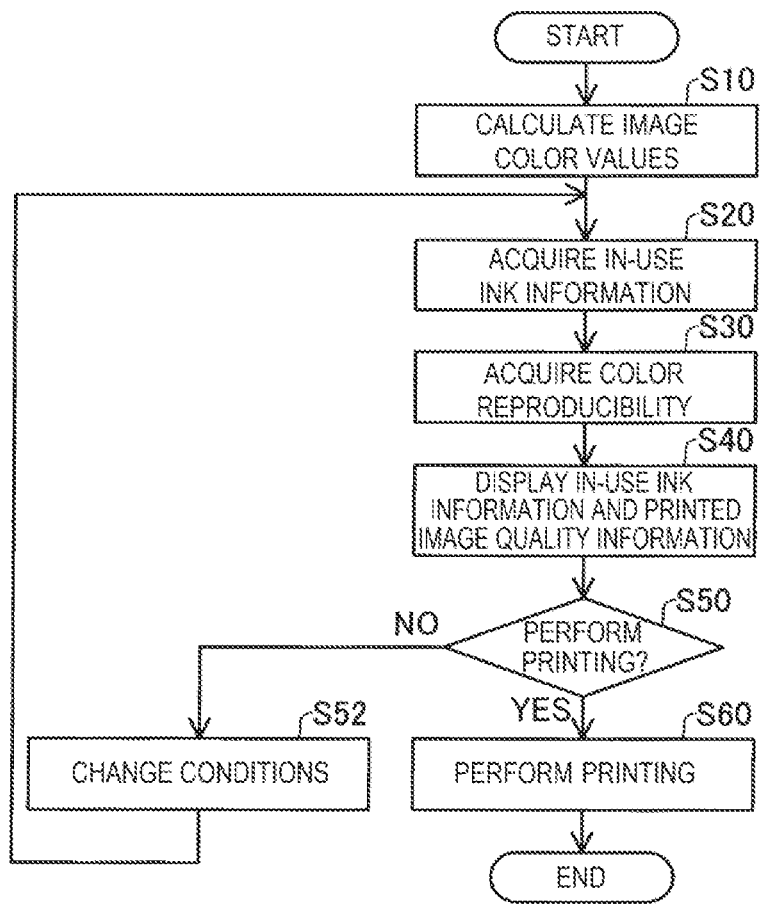
FIG. 2 is a flowchart showing image analysis performed by the image analyzer according to the first embodiment.

FIG. 2 is a flowchart showing image analysis performed by the image analyzer 100 according to the first embodiment. The procedure in the flowchart is initiated, for example, when the image analyzer 100 accepts the user's operation of performing the image analysis on the image data. The procedure may be executed, for example, when the printer 200 is instructed to perform printing.

In step S10, the in-use ink information determination section 62 uses the profile data 74 to calculate image color values (L*a*b*) from sRGB data as the image data. In step S20, the in-use ink information determination section 62 uses the color prediction model 72 to convert the image color values into ink quantity data that reproduces the spectral reflectance of an image indicated by the inputted image color values. At this point, the in-use ink information determination section 62 performs the conversion into the ink quantity data in accordance with conditions set in advance by the user, for example, ink types allowed for use and ink type duty limits. The term "duty limit" means the upper limit of the total quantity of ink dischargeable to a unit area of the print medium. Setting the duty limits can suppress or prevent problems, such as ink blots caused by the inks excessively discharged per unit area by the inkjet printer. The duty limits can each be specified in the form of a single-color duty limit or can be collectively specified in the form of a multicolor duty limit. For example, the ink quantities can be set as follows: ink quantities from 0% to 100% as the duty limit for a single color; ink quantities from 0% to 200% as the duty limit for the combination of two colors; and ink quantities from 0% to 100% multiplied by the number of ink types as a total duty limit for the combination of any other number of colors.

In step S30, the printed image quality information acquisition section 64 acquires the color reproducibility of the colors of the expected printed image. More specifically, the printed image quality information acquisition section 64 calculates a gamut from the image color values contained in the image data and determines whether the image color values contained in the image data fall within the gamut. When the image color values fall within the gamut, the printed image quality information acquisition section 64 determines that the colors contained in the image data can be reproduced, whereas when the image color values do not fall within the gamut, the printed image quality information acquisition section 64 determines that the colors contained in the image data cannot be reproduced. The printed image quality information acquisition section 64 determines the color reproducibility for each of the pixels in the image data. In the present embodiment, the printed image quality information acquisition section 64 generates a result of the determination of the color reproducibility in the form of a determination result image associated with the pixels in the image data.

In step S40, the printed image quality information acquisition section 64 outputs the acquired in-use ink information and determination result image representing the color reproducibility to the display 40 to cause the display 40 to display the received information and image. In step S50, the user refers to the result of the display performed by the display 40 to determine whether to perform printing. Having determined whether the in-use ink information and the color reproducibility satisfy predetermined conditions, the image analyzer 100 may transmit a print instruction signal to the printer 200. When the printer 200 performs printing (YES in S50), the user operates, for example, a print button displayed on the display 40 to cause step S50 to transition to step S60, where the printer 200 prints the image data.

When the printer 200 does not perform printing (NO in S50), the step S50 transitions to step S52, where the conditions are changed. When the user is not satisfied, for example, with the results of the in-use ink information and the color reproducibility, the user operates a condition change button displayed on the display 40 to cause step S50 to transition to step S52. When the conditions have been changed, step S52 returns to step S20, and the in-use ink information determination section 62 acquires the in-use ink information in accordance with the changed conditions.

Figure 3:
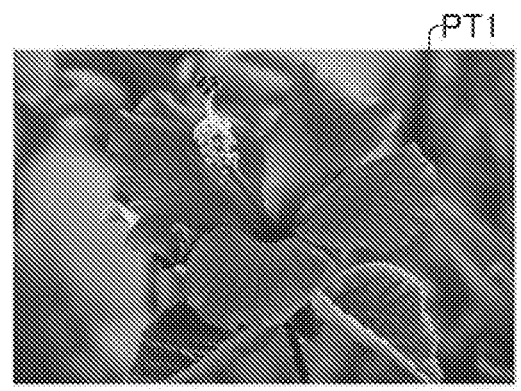
FIG. 3 is a descriptive diagram showing an example of image data.

The image analysis performed by the image analyzer 100 will be described in detail with reference to FIGS. 3 to 13. FIG. 3 is a descriptive diagram showing an example of image data PT1. The following section describes an example of the acquisition of the in-use ink information and the printed image quality information by using the image data PT1 shown in FIG. 3.

FIG. 4 is a descriptive diagram showing a condition setting screen. FIG. 4 shows an example of the conditions set in advance by the user. The user can, for example, specify ink types to be used for printing by selecting any of the checkboxes at the left end of Table TB1 via the input device 50 for operation, and set the duty limit for each of the ink types by inputting a numerical value to the duty limit at the right end. In the example in FIG. 4, the user allows use of cyan (C), magenta (M), yellow (Y), black (K), red (Rd), green (Gr), blue (Bl), violet (Vi), and orange (Or), excluding fluorescent yellow (FY) and fluorescent magenta (FM). Note that the duty limits are so set that only the black (K) duty limit is set at a small value from the viewpoint of a granularity index.

As shown at the bottom row of FIG. 4, in the present embodiment, Table TB1 further has a medium information input section to which information on the medium to be used for printing is inputted. FIG. 4 shows an example in which "photographic paper" is selected as the print medium, but the print medium is not limited to photographic paper, and any type of medium can be specified as the print medium, including plain paper and a variety of other paper media, resin films, and fabric. The medium information inputted to the medium information input section is acquired by the medium information acquisition section 66 and used, for example, to acquire the in-use ink information via the in-use ink information determination section 62, and calculate the printed image quality information via the printed image quality information acquisition section 64.

Figure 5:
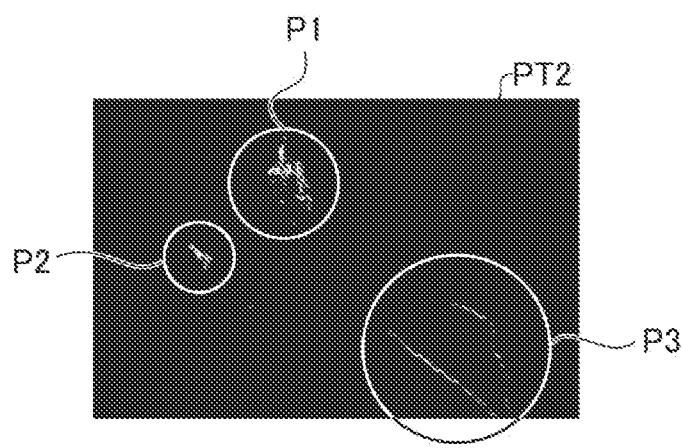
FIG. 5 is a descriptive diagram showing the result of determination of color reproducibility as printed image quality information.

FIG. 5 is a descriptive diagram showing the result of the determination of the color reproducibility as the printed image quality information. A determination result image PT2 shown in FIG. 5 shows the result of the determination of the color reproducibility provided when the image data PT1 shown in FIG. 3 is printed by using the set conditions shown in FIG. 4. In the present embodiment, the determination result image PT2 is a binary image generated with the result of the determination of the color reproducibility associated with the pixels in the image data PT1. In the example in FIG. 5, the determination result image PT2 is generated as follows: the pixels corresponding to pixels where the colors of the image data PT1 have been determined by the printed image quality information acquisition section 64 to be reproducible are drawn black; and the pixels corresponding to pixels where the colors of the image data PT1 have been determined to be unreproducible are drawn white. The example in FIG. 5 shows regions P1 to P3, which contain the pixels where the colors have been determined to be unreproducible. The determination result image PT2 is displayed on the display 40, and the user can view the result of the determination of the color reproducibility via the display 40. Using the binary image associated with the image data PT1 allows the user to readily grasp the positional relationship between the positions in the image data PT1 and the color reproducibility. To facilitate the user's comparison of the image data PT1 with the determination result image PT2, it is preferable that the image data PT1 and the determination result image PT2 be displayed side by side.

Figure 6:
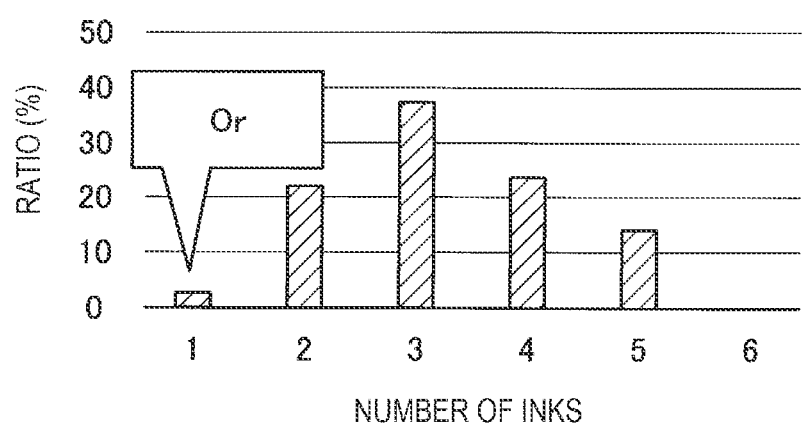
FIG. 6 is a descriptive diagram showing the result of calculation of the number of inks.

FIG. 6 is a descriptive diagram showing the result of calculation of the number of inks. The number of inks means the number of ink types used per pixel. The result of the determination in FIG. 6 is displayed on the display 40, for example, along with the printed image quality information such as the color reproducibility shown in FIG. 5. The horizontal axis of FIG. 6 shows the number of inks, and the vertical axis of FIG. 6 shows the occupancy ratio (%) of each number of inks to the total. From the result of the determination in FIG. 6, the user can grasp whether the number of inks used for printing is appropriate for the printing of the image data PT1. In the example in FIG. 6, the user can grasp the facts that there are pixels where the number of inks is one, and that there is no excessive use of ink types, such as the number of inks of six or greater. In the example in FIG. 6, the ink type is displayed in a speech balloon at the location where the number of inks is one. The user can thus readily recognize that the ink type used at the location where the number of inks is one is orange. The color of each portion of each graph may be displayed in association with the color of the corresponding ink type, so that the details of the ink types contained in the graph representing the number of inks are identified.

Figure 7:
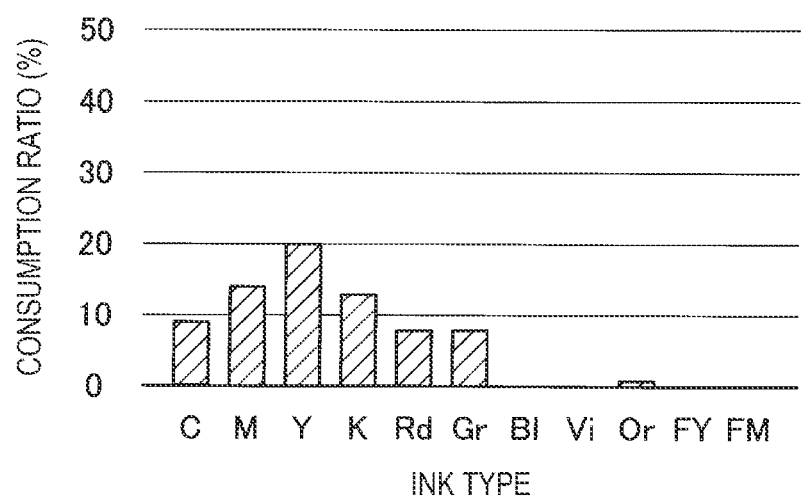
FIG. 7 is a descriptive diagram showing the result of calculation of the ink quantity on an ink type basis.

FIG. 7 is a descriptive diagram showing the result of calculation of the ink quantity on an ink type basis. The result of the determination in FIG. 7 is displayed on the display 40, for example, along with the printed image quality information such as the color reproducibility shown in FIG. 5. The horizontal axis of FIG. 7 represents the ink type, and the vertical axis of FIG. 7 represents the ratio of the ink quantity of each ink type to the total ink quantity of the ink types used to print the image data PT1. From the in-use ink information shown in FIG. 7, the user can grasp, for example, the fact that almost none of blue, violet, and orange, which are special inks, is used. From the result of the determination in FIG. 7, the user can further grasp, for example, the consumption of each color ink before printing, and can examine the printed image quality information, such as the color reproducibility, the printing cost, and other factors before printing.

Figure 8:
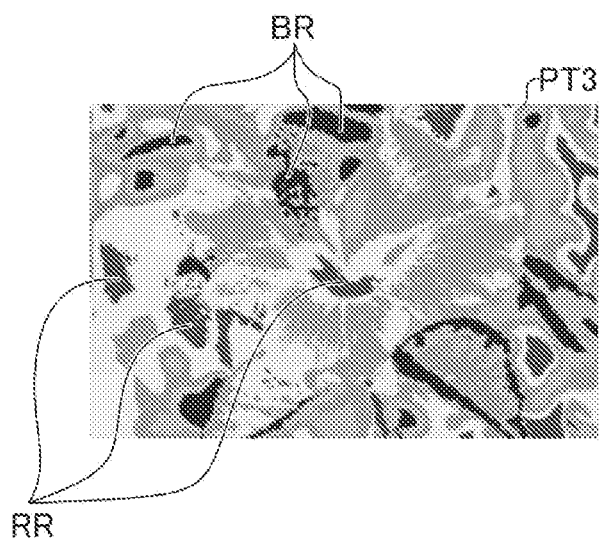
FIG. 8 is a descriptive diagram showing the correspondence between the number of inks and the image data.

FIG. 8 is a descriptive diagram showing the correspondence between the number of inks and the image data PT1. A determination result image PT3 shown in FIG. 8 is an image in which the numbers of inks shown in FIG. 6 are associated with the pixels in the image data PT1. It can be said that the determination result image PT3 is what is called a heatmap of the number of inks, which visualizes the number of inks at each position in the image data PT1. Regions BR shown in FIG. 8 are regions where a small number of inks are used in the image data PT1, and are drawn blue in practice. Regions RR are regions where a large number of inks are used in the image data PT1, and are drawn red in practice. The other regions labeled with no reference characters represent the numbers of inks stepwise by using light blue, green, yellow, and other colors in accordance with the numbers of inks. The heatmap, which associates the image data PT1 with the numbers of inks, allows the user to determine whether the ink types and the numbers of inks to be used are appropriate in relation to the nature of the image data PT1.

FIG. 9 is a descriptive diagram showing Table TB1 after a first change in the conditions made by the user. FIG. 9 shows an example in which the user has changed the conditions to those that exclude an ink type consumed by a small quantity, such as orange, for reduction in the number of ink types to be used from the viewpoints of cost reduction and other factors based, for example, on the in-use ink information shown in FIGS. 6 and 7. When the user changes the conditions, the in-use ink information determination section 62 calculates the in-use ink information in accordance with the changed conditions, and the printed image quality information acquisition section 64 evaluates the color reproducibility by using the in-use ink information calculated in accordance with the changed conditions.

Figure 10:
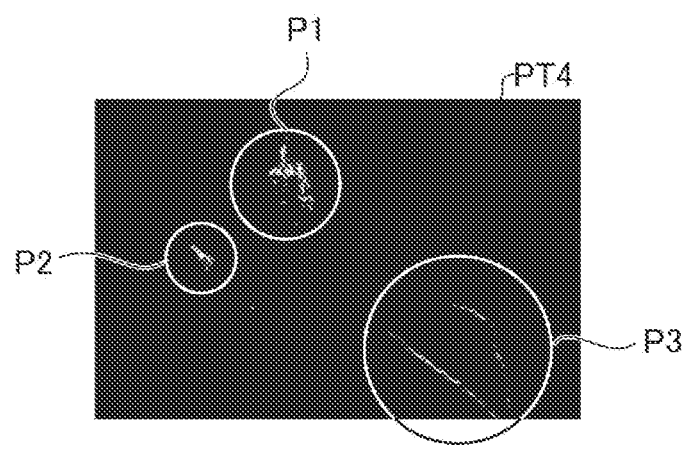
FIG. 10 is a descriptive diagram showing the result of the determination of the color reproducibility after the first change in the conditions.

FIG. 10 is a descriptive diagram showing the result of the determination of the color reproducibility after the first change in the conditions. As shown in FIG. 10, the color reproducibility after the change in the conditions shows the regions P1 to P3, which contain the locations where the color reproducibility cannot be achieved, as in FIG. 5. The user who checks a determination result image PT4 in FIG. 10 can grasp the fact that color reproducibility comparable to the color reproducibility shown in FIG. 5 before the change in the conditions can be achieved, for example, even when the number of ink types to be used is reduced by the change in the conditions, and recognize that the reduction in the number of ink types affects the image quality only by a small degree.

Figures 11, 12:
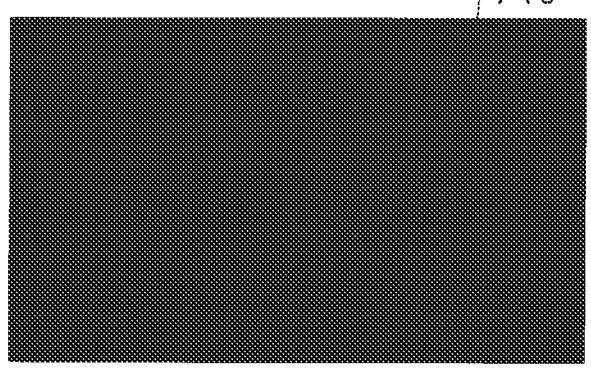
FIG. 11 is a descriptive diagram showing the table after a second change in the conditions made by the user.
FIG. 12 is a descriptive diagram showing the result of evaluation of the color reproducibility after the second change in the conditions.

FIG. 11 is a descriptive diagram showing Table TB1 after a second change in the conditions made by the user. FIG. 11 shows an example in which the user has changed the conditions to those that allow use of the fluorescent yellow by way of example in order to improve the color reproducibility based, for example, on the determination result image PT4 shown in FIG. 10. The user can grasp the fact that the ink type required to achieve satisfactory color reproducibility is, for example, the fluorescent yellow based, for example, on the relationship between the regions P1 to P3, which contain many locations where the color reproducibility cannot be achieved, and the hue of the image data PT1 that are contained in the regions P1 to P3. When the user changes the conditions, the in-use ink information determination section 62 calculates the in-use ink information in accordance with the changed conditions, and the printed image quality information acquisition section 64 evaluates the color reproducibility by using the in-use ink information calculated in accordance with the changed conditions.

FIG. 12 is a descriptive diagram showing the result of the evaluation of the color reproducibility after the second change in the conditions. The color reproducibility after the change in the conditions shows that the regions P1 to P3, where the color reproducibility cannot be achieved based on the result of the evaluation of the color reproducibility, have disappeared, as shown in FIG. 12. By checking a determination result image PT5, the user can grasp the fact that high color reproducibility can be achieved across the entire image data PT1, for example, when the user allows use of the fluorescent yellow by changing the conditions.

Figure 13:
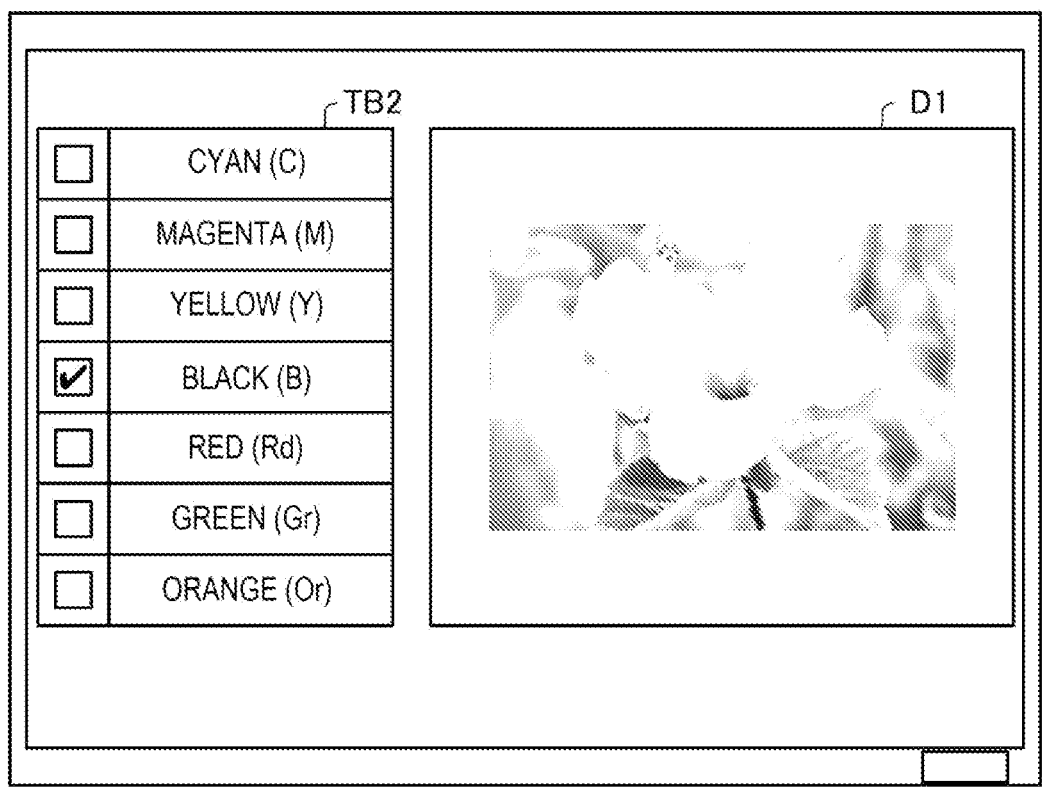
FIG. 13 is a descriptive diagram showing the correspondence between the ink quantities and the image data.

FIG. 13 is a descriptive diagram showing the correspondence between the ink quantities and the image data PT1. An image D1 shown in the right portion of FIG. 13 is an image in which the ink quantities shown in FIG. 7 are associated with the pixels in the image data PT1. The image D1 is an image expressed in grayscales, for example, with the locations where the ink quantity is maximized drawn black, and the locations where the ink quantity is minimized drawn white. The user, for example, selects an ink type of which the user desires to check the ink quantity from Table TB2 shown in the left portion of FIG. 13. The in-use ink information determination section 62 refers to the in-use ink information having already been acquired to generate the image D1 in which the ink quantities of the specified ink type are associated with the pixels in the image data PT1. Based on the image D1, the user can readily examine the appropriateness of the set in-use ink information, for example, by grasping the appropriateness of the ink quantity of an ink type that affects the image quality, such as granularity, and cost in relation to the image data PT1.

As described above, the image analyzer 100 according to the present embodiment includes the in-use ink information determination section 62, which determines the ink type to be used for printing and the ink quantity to be used for printing on an ink type basis as the in-use ink information by using the image data PT1 in accordance with conditions set in advance, the printed image quality information acquisition section 64, which acquires the printed image quality information provided when the image data PT1 is printed by using the determined in-use ink information, and the display 40, as a display section that displays the in-use ink information and the printed image quality information. The user can therefore grasp the in-use ink information and the printed image quality information based on the in-use ink information before printing. The user can check the in-use ink information and the printed image quality information before printing and change the conditions to produce a printed image suitable for the user's requirements.

In the image analyzer 100 according to the present embodiment, the printed image quality information acquisition section 64 acquires the color reproducibility as the printed image quality information. The user can produce a printed image having suitable color reproducibility by grasping the color reproducibility before printing and changing the conditions.

The image analyzer 100 according to the present embodiment further includes the medium information acquisition section 66, which acquires information on a medium used for printing. The user can therefore set conditions suitable for each print medium and produce a printed image having image quality suitable for the print medium.

B. Second Embodiment

Figure 14:
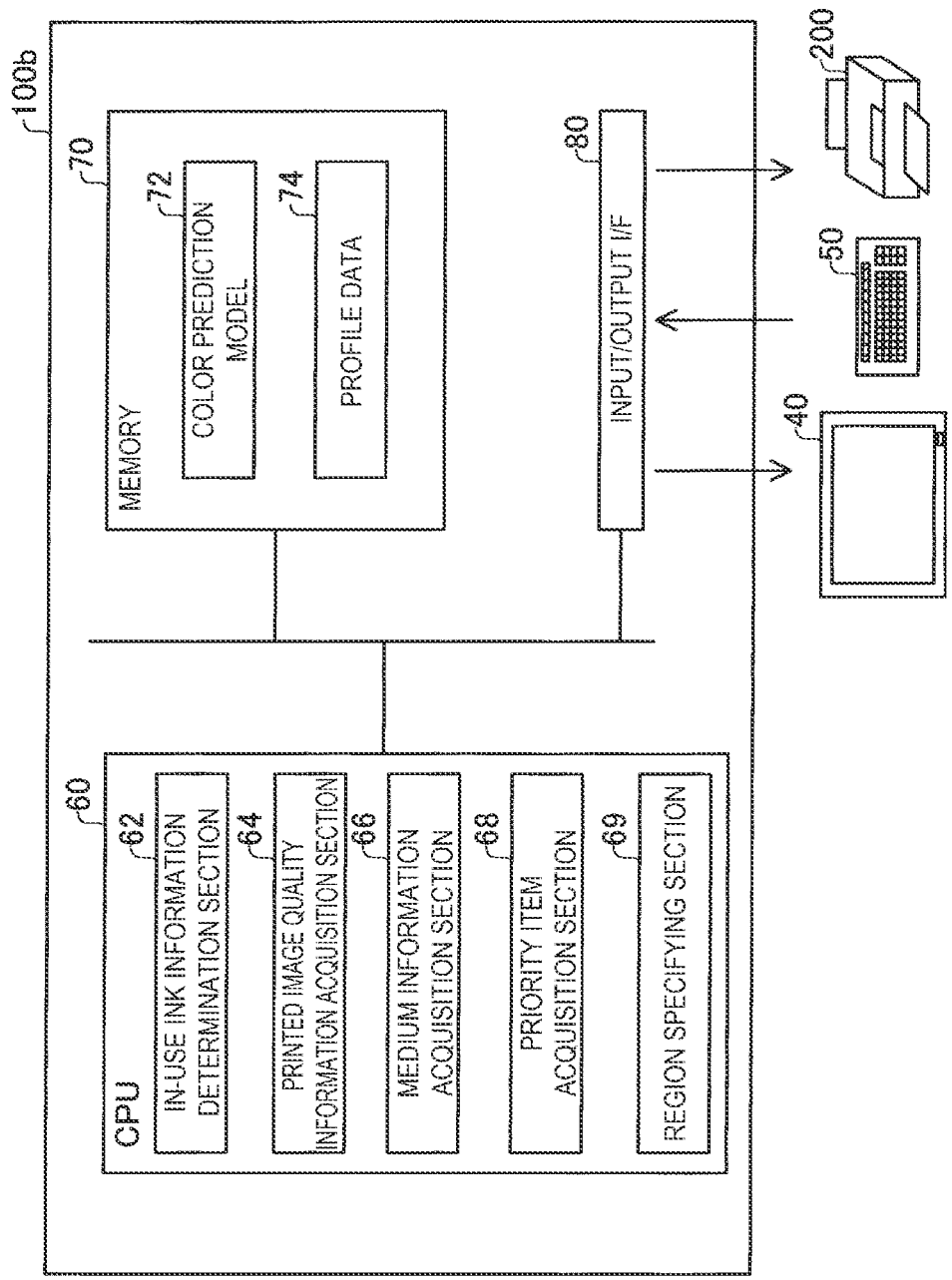
FIG. 14 is a block diagram showing the configuration of the image analyzer according to a second embodiment.

FIG. 14 is a block diagram showing the configuration of an image analyzer 100b according to a second embodiment.

The image analyzer 100b according to the second embodiment differs from the image analyzer 100 according to the first embodiment in that a priority item acquisition section 68 and a region specifying section 69 are further provided, and that the printed image quality information acquisition section 64 acquires a tonality index and a granularity index as the printed image quality information in addition to the color reproducibility, and the other configurations of the image analyzer 100b are the same as those of the image analyzer 100. The priority item acquisition section 68 acquires the priority of items of the printed image quality information inputted by the user. The region specifying section 69 acquires an individual setting region for individually setting the conditions.

An index representing evaluation of the degree of smoothness of the arrangement of grid points corresponding to the colors of a sample in a predetermined color space can be employed as evaluation of the tonality. For example, a difference in color information between adjacent pixels in the image data PT1 is calculated, and the difference is compared with a threshold to calculate the location where a tone jump occurs in the image and the amount of the tone jump. Furthermore, the cumulative value of the resultant amounts of the tone jumps across the entire image is calculated as a tonality evaluation value. Smoothening the arrangement of the grid points corresponding to the colors of the sample in the predetermined color space allows suppression of the occurrence of tone jumps and generation of printed matter in which the tone smoothly changes.

The granularity index is the degree of graininess or noise that a user perceives when viewing printed matter. For example, the granularity index can be one which includes an index generated by simulating the recording state of ink dots in an imaginary patch and evaluating the spatial frequency of the result of the simulation. In the present embodiment, the printed image quality information acquisition section 64 calculates a granularity index GI by using Expression (1) below. The smaller the granularity index GI, the less the degree of granularity the user perceives.

[Math. 1]

$$GI = a_L \int \sqrt{WS(u)} VTF(u) du \quad (1)$$

In Expression (1), aL represents a lightness correction term that has a variable in the form of the average density and corrects the difference between the density and the brightness perceived by humans, WS(u) represents the Wiener spectrum of an image indicated by halftone data, VTF represents the spatial frequency characteristic of vision, and u represents the spatial frequency. Although Expression (1) is a one-dimensional expression, the spatial frequency of a two-dimensional image may be calculated as a function of the spatial frequencies u and v. It is, however, noted that the granularity index is not necessarily expressed by Expression (1) described above, and any other expression can be used as long as the expression shows an index representing evaluation of the granularity of a printed image.

Figures 15, 16:
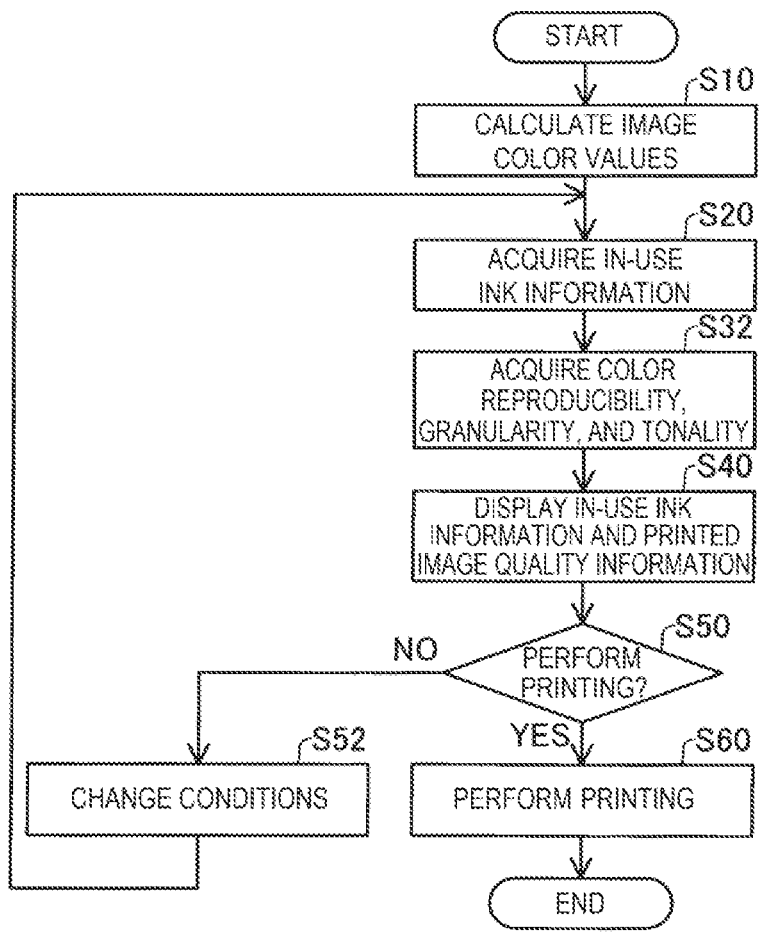
FIG. 15 is a flowchart showing the image analysis performed by the image analyzer according to the second embodiment.
FIG. 16 is a descriptive diagram showing how a priority item acquisition section acquires the priority of items of the printed image quality information.

FIG. 15 is a flowchart showing the image analysis performed by the image analyzer 100b according to the second embodiment. The flowchart in the second embodiment differs from that in the first embodiment in that step S30 is replaced with step S32, but is the same as that in the first embodiment in terms of the other configurations. In step S32, the printed image quality information acquisition section 64 acquires the color reproducibility as the printed image quality information, as in step S30, and further acquires the granularity index GI and the tonality.

FIG. 16 is a descriptive diagram showing how the priority item acquisition section 68 acquires the priority of the items of the printed image quality information. Table TB3 shown in FIG. 16 is an example of the image displayed on the display 40. The priority item acquisition section 68 accepts the result of input operation performed on Table TB3 by the user as the setting of a condition under which the priority of the items of the printed image quality information is set. In the present embodiment, the user sets the priority of the plurality of items of the printed image quality information, the color reproducibility, the granularity, and the tonality, in acquiring the in-use ink information. Checkboxes that allow the user to determine whether to take account of the items of the printed image quality information are provided at the left end of Table TB3. In the example in FIG. 16, all the checkboxes are selected to acquire the in-use ink information that takes account of the three items of the printed image quality information, the color reproducibility, the granularity, and the tonality. Three priority levels, high, medium, and low, for determining the priority of the three items of the printed image quality information are set at the right end of Table TB3. In the example in FIG. 16, the three items of the printed image quality information are set as follows: the color reproducibility has the highest priority; the granularity has the lowest priority; and the tonality is between the granularity and the color reproducibility in terms of priority. Setting high priority causes, for example, selection of in-use ink information that leads to the best result of the printed image quality information having the high priority.

Figure 17:
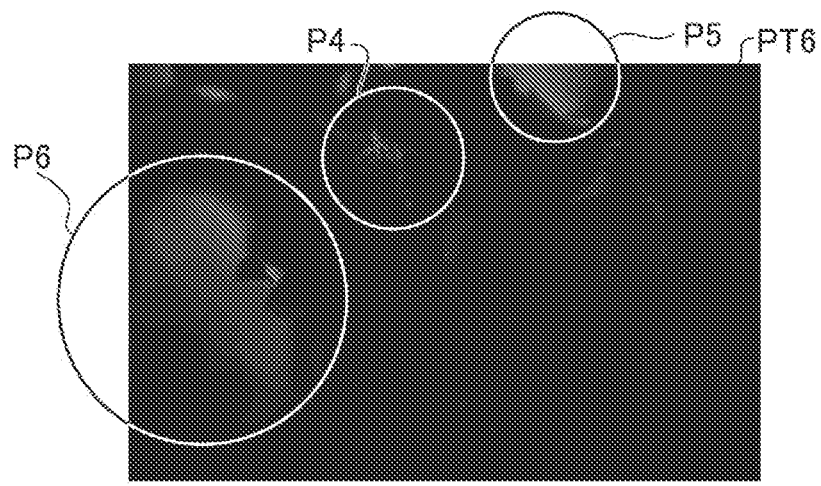
FIG. 17 is a descriptive diagram showing the result of evaluation of granularity.

FIG. 17 is a descriptive diagram showing the result of determination of the granularity. A determination result image PT6 shown in FIG. 17 shows the result of determination of the granularity index GI provided when the image data PT1 is printed by using the in-use ink information calculated in accordance with the priority shown in FIG. 16. The determination result image PT6 associated with the image data PT1 allows the user to readily recognize which position in the image data PT1 has a high granularity index GI. The user can view the result of the evaluation of the granularity via the determination result image PT6. In the example in FIG. 17, the determination result image PT6 is a grayscale image, with the locations where the granularity index GI is maximized drawn white and the locations where the granularity index GI is minimized drawn black. Regions P4 to P6 containing locations where the granularity index GI is high can be seen in the determination result image PT6, as shown in FIG. 17. The following description will be made with reference to a case where the user preferentially improves the granularity indices GI in the regions P4 to P6 by using the individual setting region.

Figure 18:
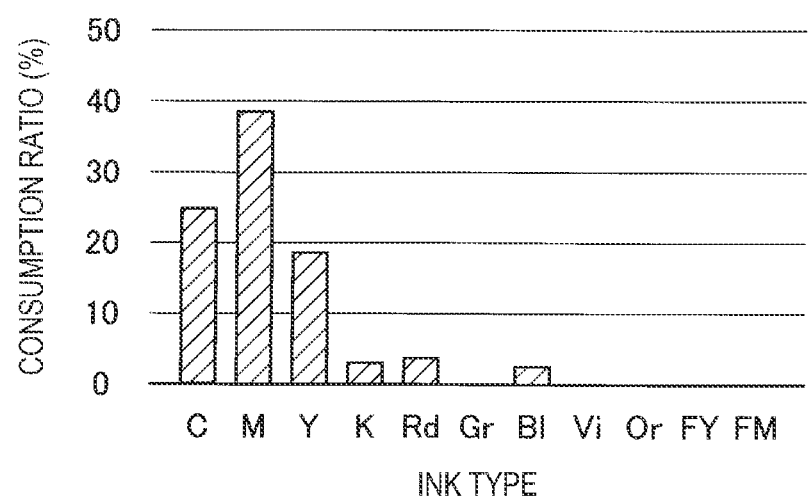
FIG. 18 is a descriptive diagram showing the result of evaluation of the ink quantity on an ink type basis based on an individual setting region and conditions specified by a priority specifying section.

FIG. 18 is a descriptive diagram showing the result of evaluation of the ink quantity on an ink type basis based on the individual setting region and conditions specified by the priority specifying section. The configuration of the graph shown in FIG. 18 is the same as that of the graph in FIG. 7 and will therefore not be described. From the results of the determination in FIG. 18 and FIG. 17, the user can determine before printing whether the in-use ink information and the printed image quality information match desired contents. In the present embodiment, the user determines to give priority to improvement in the granularity as a result of checking of the result of the evaluation of the granularity shown in FIG. 17 and the in-use ink information shown in FIG. 18. While referring to the determination result image PT6, the user sets the individual setting region, for example, by enclosing each of the regions P4 to P6 with a circle by operating a cursor on the screen via the input device 50 for operation, such as a mouse.

Figures 19, 20:
FIG. 19 is a descriptive diagram showing the priority of the items of the printed image quality information after the conditions are changed.
FIG. 20 is a descriptive diagram showing the result of the evaluation of the granularity after the conditions are changed.

FIG. 19 is a descriptive diagram showing the priority of the items of the printed image quality information after the conditions are changed. FIG. 19 shows the result of the user's changing of the initially set priority shown in FIG. 16. The user has set the priority, for example, in such a way that the highest priority is given to the granularity and the color reproducibility is not taken into account in the calculation of the in-use ink information, as shown in FIG. 19. The in-use ink information determination section 62 acquires the in-use ink information in accordance with the conditions on the priority acquired by the priority item acquisition section 68 and the individual setting region formed of the regions P4 to P6 acquired by the region specifying section 69.

Figure 21:
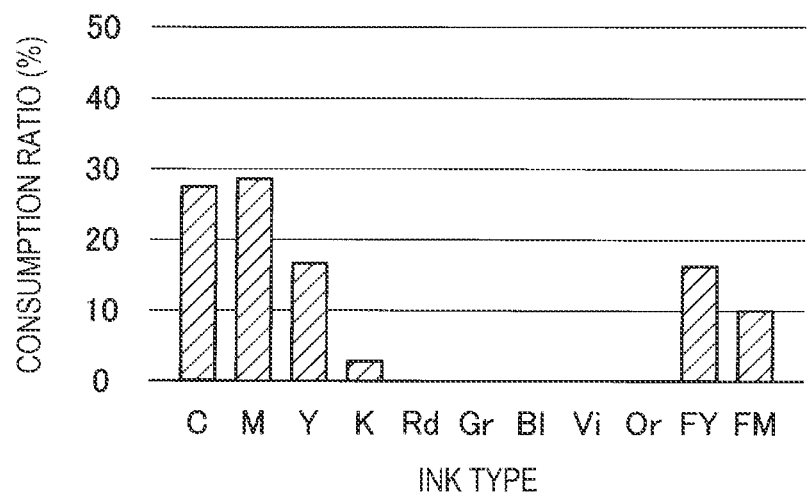
FIG. 21 is a descriptive diagram showing the result of the evaluation of the ink quantity on an ink type basis after the conditions are changed.

FIG. 20 is a descriptive diagram showing the result of the determination of the granularity after the conditions are changed. FIG. 21 is a descriptive diagram showing the result of the evaluation of the ink quantity on an ink type basis after the conditions are changed. The configuration of the graph shown in FIG. 21 is the same as that of the graph in FIG. 7 and will therefore not be described. According to a determination result image PT7 shown in FIG. 20, it can be ascertained that highly granular regions have disappeared as a result of the increase in the priority of the granularity index GI specified by the user in the regions P4 to P6. It can further be ascertained that the consumptions of the black, red, and blue inks, the latter two of which are special inks, have decreased, and that the consumptions of the fluorescent yellow and fluorescent magenta inks have instead increased, as shown in FIG. 21. For example, when the printed image quality information and the in-use ink information in the determination result image PT7 match desired contents, the user instructs start of printing.

In the image analyzer 100b according to the present embodiment, the printed image quality information acquisition section 64 acquires the granularity index GI as the printed image quality information. The user can therefore produce a printed image having a suitable granularity index GI by grasping the granularity index GI before printing and changing the conditions.

The image analyzer 100b according to the present embodiment includes the priority item acquisition section 68, which specifies the priority of the plurality of items of the printed image quality information in acquiring the in-use ink information. The in-use ink information determination section 62 acquires the in-use ink information in accordance with the specified priority. A printed image having desired image quality can therefore be produced in a simplified manner by setting the priority of the plurality of items of the printed image quality information.

In the image analyzer 100b according to the present embodiment, the priority item acquisition section specifies the priority of the color reproducibility, the granularity index, and the tonality as the plurality of items of the printed image quality information. Using the plurality of items of the printed image quality information, which are important factors in determining the image quality of a color image, allows the user to increase the likelihood of generation of a printed image having desired color image quality.

The image analyzer 100b according to the present embodiment further includes the region specifying section 69, which specifies the individual setting region for individually setting the conditions in the image data PT1. The in-use ink information determination section 62 acquires the in-use ink information in accordance with the conditions individually set in the individual setting region. The user can therefore set the conditions in more detail than in a case where the conditions are changed uniformly across the entire image data PT1, and can achieve more suitable image quality and in-use ink information.

C. Other Embodiments (C1) The first embodiment described above shows the case where the color reproducibility as the printed image quality information is displayed, for example, in the form of an image associated with the image data PT1 by using any of the determination result image PT2, the determination result image PT4, and the determination result image PT5 shown in FIGS. 5, 10, and 12, respectively. In contrast, the printed image quality information does not need to be associated with the image data PT1 when displayed, and may be displayed only in the form of a numerical value, for example, the ratio of pixels where the color reproducibility cannot be achieved to all pixels.

(C2) The second embodiment described above shows the case where the region specifying section specifies a region through the user's operation of the cursor, for example, with a mouse on the determination result image PT6. In contrast, the region specifying section does not need to specify a region through the user's operation on the image, and may set a region, for example, by using a numerical value in the printed image quality information or the in-use ink information.

Figure 22:
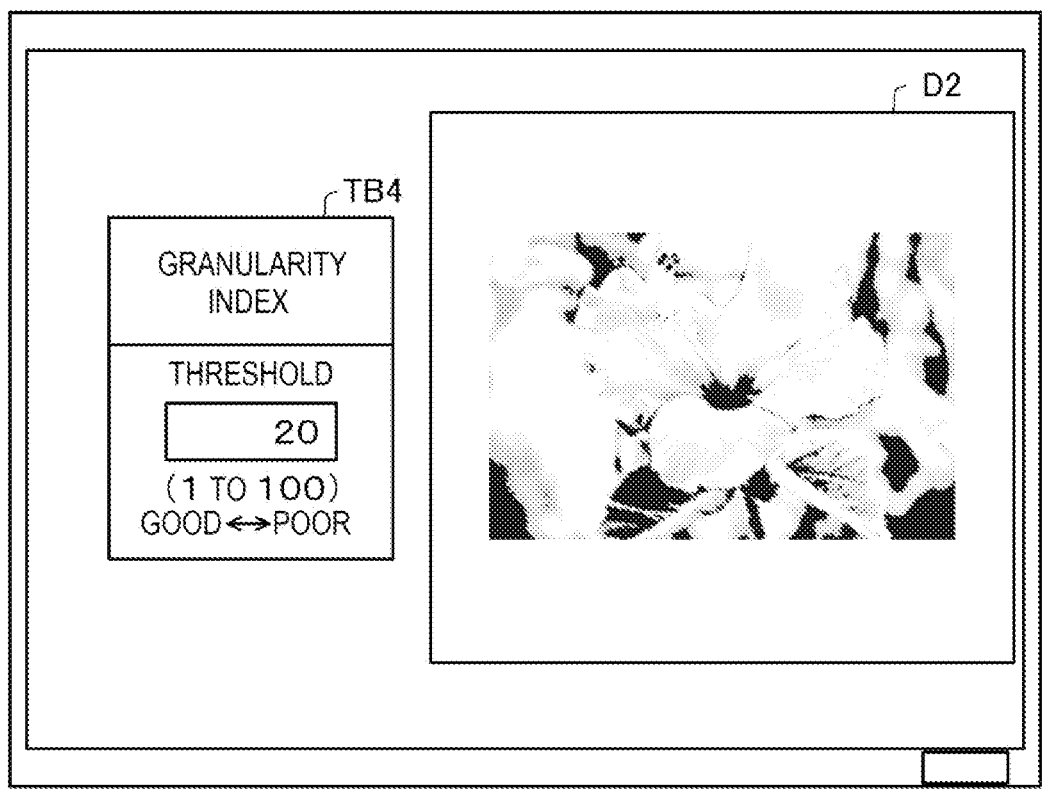
FIG. 22 is a descriptive diagram showing how to set the individual setting region in another embodiment.

FIG. 22 is a descriptive diagram showing how to set the individual setting region in another embodiment. Table TB4 in the left portion of FIG. 22 shows a window for specifying a threshold of the granularity index GI as the printed image quality information. In the example in FIG. 22, the individual setting region is specified by using the result of the evaluation of the granularity index GI as the printed image quality information. More specifically, pixels each showing a granularity index GI greater than or equal to the specified threshold are set as the individual setting region.

An image D2 in the right portion of FIG. 22 shows the individual setting region specified based on an input value in Table TB4. In the example in FIG. 22, the individual setting region is drawn white, and the region outside the individual setting region is drawn black. The user can accurately specify a region having poor granularity indices GI, for example, by numerically specifying the locations having the poor granularity indices GI, as compared with a case where the user specifies the region, for example, visually through the image.

D. Other Aspects

The present disclosure is not limited to the embodiments described above and can be achieved in a variety of other configurations to the extent that they do not depart from the intent of the present disclosure. For example, the technical features described in the embodiments and corresponding to the technical features in the aspects described in the paragraph of Summary can be replaced with other features or combined with each other as appropriate to solve part or entirety of the problem described above or achieve part or entirety of the effects described above. Furthermore, when any of the technical features has not been described as an essential feature in the present specification, the technical feature can be deleted as appropriate.

(1) According to an aspect of the present disclosure, an image analyzer is provided. The image analyzer includes an in-use ink information determination section that determines an ink type to be used for printing and an ink quantity to be used for printing for the ink type as in-use ink information by using image data in accordance with conditions set in advance, a printed image quality information acquisition section that acquires at least one item of printed image quality information on image quality specified in advance and provided when the image data is printed by using the determined in-use ink information, and a display section that displays at least one of the in-use ink information and the printed image quality information. The image analyzer in the aspect described above allows a user to grasp the in-use ink information and the printed image quality information based on the in-use ink information before printing.

(2) In the image analyzer in the aspect described above, the printed image quality information acquisition section may acquire color reproducibility as the printed image quality information. The image analyzer in the aspect described above allows the user to grasp the color reproducibility before printing.

(3) In the image analyzer in the aspect described above, the printed image quality information acquisition section may acquire a granularity index as the printed image quality information. The image analyzer in the aspect described above allows the user to grasp the granularity index before printing.

(4) The image analyzer in the aspect described above may include a priority item acquisition section that acquires specified priority of a plurality of items of the printed image quality information in acquiring the in-use ink information. The in-use ink information determination section may acquire the in-use ink information in accordance with the acquired priority. The image analyzer in the aspect described above allows the user to produce a printed image having desired image quality in a simplified manner by setting the priority of the plurality of items of the printed image quality information.

(5) In the image analyzer in the aspect described above, the priority item acquisition section may specify the priority of the color reproducibility, the granularity index, and tonality as the plurality of items of the printed image quality information. The image analyzer in the aspect described above can use the plurality of items of the printed image quality information, which are important factors in determining the image quality of a color image, to allow the user to increase the likelihood of generation of a printed image having desired color image quality.

(6) The image analyzer in the aspect described above may further include a region specifying section that specifies an individual setting region for individually setting the conditions in the image data. The in-use ink information determination section may acquire the in-use ink information in accordance with the individually set conditions in the individual setting region. The image analyzer in the aspect described above allows the user to set the conditions in more detail than in the case where the conditions are changed uniformly across the entire image data, and achieve more suitable image quality and in-use ink information.

(7) The image analyzer in the aspect described above may further include a medium information acquisition section that acquires information on a medium to be used for printing. The image analyzer in the aspect described above allows the user to set conditions suitable for each print medium and generate a printed image having image quality suitable for the print medium.

The present disclosure can also be implemented in a variety of aspects other than an image analyzer. For example, the present disclosure can be implemented in the form of a printing apparatus, an image analysis method, a printing method, a method for controlling an image analyzer, a method for controlling a printing apparatus, a user interface used for a printing apparatus, a computer program that realizes the functions of any of the methods or apparatuses described above, a recording medium on which the computer program is recorded, and a data signal that includes the computer program and is embodied in a carrier wave.

In each of the embodiments described above, a portion of the configuration realized by hardware may be replaced with software, or conversely, a portion of the configuration realized by software may be replaced with hardware. When part or entirety of the functions in the present disclosure is achieved by software, the software (computer program) can be provided in the form of a computer readable recording medium that stores the software. In the present disclosure, the "computer readable recording medium" is not limited to a portable recording medium, such as a flexible disk and a CD-ROM, and includes an internal storage device in a computer, such as a variety of RAMS and ROMs, and an external storage device fixed to the computer, such as a hard disk drive. That is, the "computer readable recording medium" has a wide meaning including any recording medium capable of permanently storing data instead of temporal storage.

What is claimed is:

1. An image analyzer comprising:
   an in-use ink information determination section that determines an ink type to be used for printing and an ink quantity to be used for printing for the ink type as in-use ink information by using image data in accordance with conditions set in advance;
   a printed image quality information acquisition section that acquires at least one item of printed image quality information on image quality specified in advance and provided when the image data is printed by using the determined in-use ink information; and
   a display section that displays at least one of the in-use ink information and the printed image quality information.

2. The image analyzer according to claim 1,
   wherein the printed image quality information acquisition section acquires color reproducibility as the printed image quality information.

3. The image analyzer according to claim 1,
   wherein the printed image quality information acquisition section acquires a granularity index as the printed image quality information.

4. The image analyzer according to claim 1,
   further comprising a priority item acquisition section that acquires specified priority of a plurality of items of the printed image quality information in acquiring the in-use ink information,
   wherein the in-use ink information determination section acquires the in-use ink information in accordance with the acquired priority.

5. The image analyzer according to claim 4,
   wherein the priority item acquisition section specifies the priority of color reproducibility, a granularity index, and tonality as the plurality of items of the printed image quality information.

6. The image analyzer according to claim 1,
   further comprising a region specifying section that specifies an individual setting region for individually setting the conditions in the image data, wherein the in-use ink information determination section acquires the in-use ink information in accordance with the individually set conditions in the individual setting region.

7. The image analyzer according to claim 1, further comprising a medium information acquisition section that acquires information on a medium to be used for printing.

\* \* \* \* \*